Nov. 28, 1950   J. J. KIRSCHMAN   2,531,940
FISHING FLOAT
Filed July 27, 1948   2 Sheets-Sheet 1
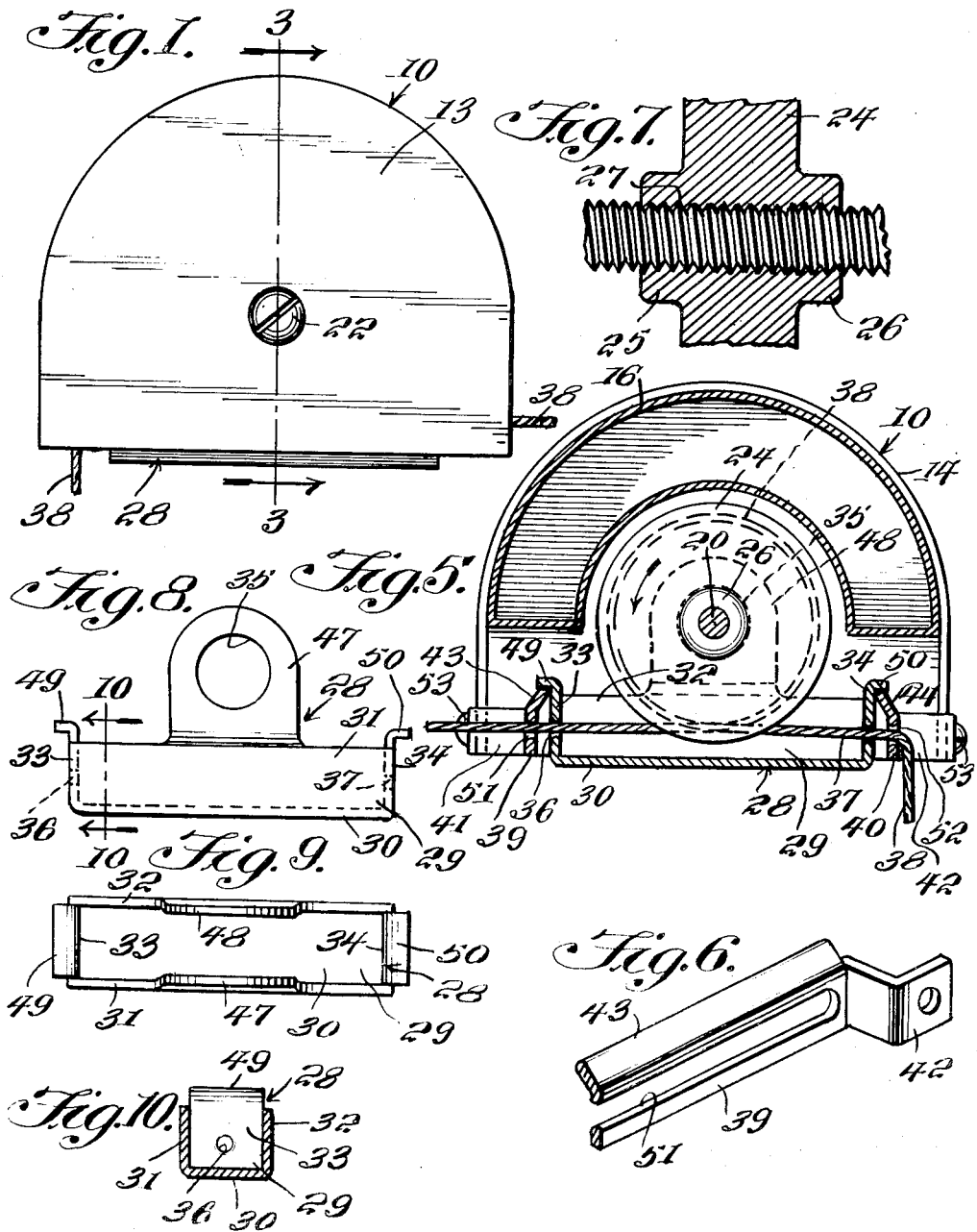
INVENTOR.
Jack J. Kirschman,
BY Victor J. Evans & Co.
ATTORNEYS Nov. 28, 1950 J. J. KIRSCHMAN 2,531,940
FISHING FLOAT
Filed July 27, 1948 2 Sheets-Sheet 2
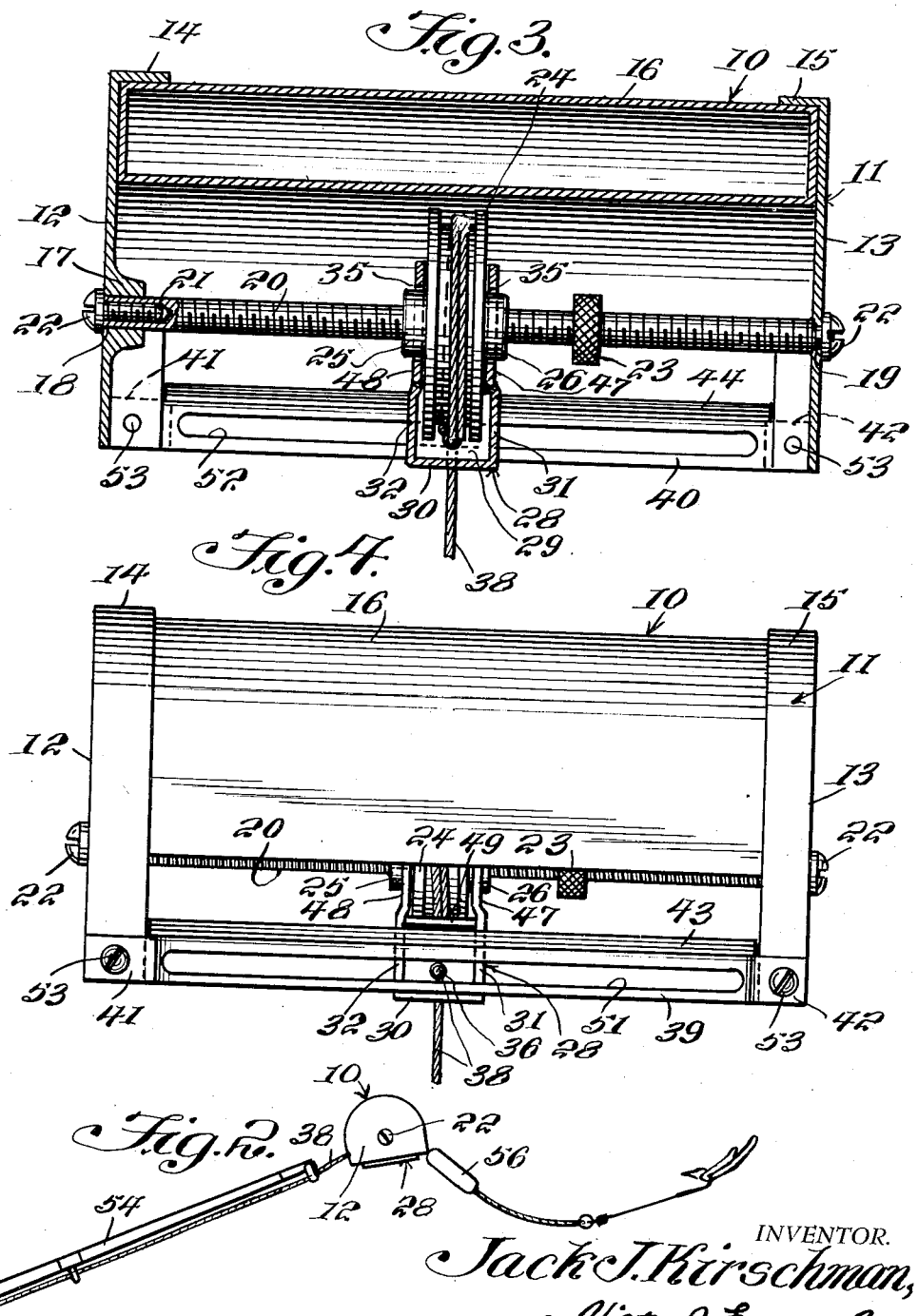
INVENTOR.
Jack J. Kirschman,
BY Victor J. Evans & Co.
ATTORNEYS Patented Nov. 28, 1950

2,531,940

UNITED STATES PATENT OFFICE 2,531,940

FISHING FLOAT

Jack J. Kirschman, Atlantic City, N. J.

Application July 27, 1948, Serial No. 40,819

4 Claims. (Cl. 43—43.11)

This invention relates to a fishing float, and more particularly to a fishing float for use with a casting or hand line.

The object of the invention is to provide a fishing float for a casting or hand line which will permit an operator to maintain full control over the length to which the sinker drops.

A further object of the invention is to provide a fishing float which is extremely simple and inexpensive to manufacture.

Other objects and advantages of the invention will be apparent during the course of the following description.

In the accompanying drawings forming a part of this application, and in which like numerals are employed to designate like parts throughout the same:

Figure 1 is a side elevational view of the fishing float according to the present invention;

Figure 2 is a side elevational view of the fishing float attached to a fish line according to the present invention;

Figure 3 is a sectional view taken on the line 3—3 of Figure 1;

Figure 4 is a front elevational view of the fishing float;

Figure 5 is a view showing certain constructional details of the device;

Figure 6 is a fragmentary perspective view of the spacer bar;

Figure 7 is an enlarged sectional view of the pulley on the screw;

Figure 8 is a side elevational view of the slide casing;

Figure 9 is a top plan view of the slide casing;

Figure 10 is a sectional view taken on the line 10—10 of Figure 9.

Referring to the drawings, the fishing float of the present invention is indicated by the numeral 10 and comprises a frame 11. The frame 11 includes a pair of spaced parallel end walls 12 and 13 provided with flanges 14 and 15, respectively. Extending between the end walls 12 and 13 and secured to the end wall 13, as by welding, is a semi-cylindrical float chamber 16 for supporting the fishing float on the surface of the water. Arranged on the inner face of the end wall 12 and secured thereto is a boss 17 for a purpose to be subsequently described.

The ends walls 12 and 13 are provided with a pair of aligned apertures 18 and 19, respectively. Extending between the end walls 12 and 13 and rotatably seated in the boss 17 is a threaded shaft or horizontally-disposed screw 20, each end of the screw 20 being provided with a threaded socket 21 for receiving a headed bolt 22. The bolts 22 project through the apertures 18 and 19 of the end walls 12 and 13 for releasably securing the screw 20 therebetween. Rotatably mounted on the screw 20 is a nut 23 having a knurled exterior surface thereon.

Arranged intermediate the ends of the screw 20 is a pulley 24 having a shoulder 25 and 26 secured to each side of the pulley 24. The shoulders 25 and 26 and pulley 24 are provided with a threaded bore 27 for rotatably receiving the screw 20 therein, Figure 7.

Carried by the pulley 24 is a slider casing 28, the slider casing 28 embodying a pan 29 having a bottom wall 30, a pair of spaced parallel side walls 31 and 32 and a pair of end walls 33 and 34. Projecting from the side walls 31 and 32 is a plate 47 and 48, respectively, and each plate has an opening 35 therein for rotatably receiving the shoulders 25 and 26 of the pulley 24 so that as the pulley 24 moves longitudinally along the screw 20, the slider casing 28 will likewise be carried therealong. Each of the upper edges of the end walls 33 and 34 are bent outwardly to define a slide hook 49 and 50 for a purpose to be subsequently described. The end walls 33 and 34 are provided with an aperture 36 and 37, respectively, Figures 5, 8 and 10, for receiving a fishing line 38.

Arranged transversely with respect to the end walls 12 and 13 of the frame 11 is a pair of spacer bars 39 and 40. Each spacer bar is provided with a longitudinally-extending slot 51 and 52, respectively, for the reception of the fishing line 38, and secured to each end of each of the spacer bars is an apertured bracket 41 and 42 for the reception of a bolt 53 for securing the spacer bars to the flanges 14 and 15 of the respective end walls 12 and 13, Figures 3 and 4. Arranged at an angle with respect to the spacer bars 39 and 40 and secured to the top of the latter are the strips 43 and 44, respectively, for slidably supporting the complemental slide hooks 49 and 50 of the slider casing 28.

In the use of the fishing float, with the float 10 assembled, the fishing line 38, which is carried by the fishing rod 54, is passed successively through slot 51 of the spacer bar 39 through the opening 36 in the end wall 33 of the slider casing 28 and coiled or wrapped a full turn about the pulley 24. The fishing line is then passed through the opening 37 in the opposite end wall 34 of the slider casing 28 and out through the slot 52 of the spacer bar 40 where sinker 56 is attached to the line 38.

When a cast is made, or when a hand line is being used, the float 10 alights on the water and stays on the surface while the sinker drops toward the bottom and operates or rotates the pulley 24 along the screw 20 until the movement of the pulley 24 is stopped by the nut 23. The nut 23 may be moved along the screw 20 to any desired position so that the operator has full control over the depth to which the sinker 56 drops. A slider casing 28 is carried by the pulley 24 with the fishing line 38 passing through aligned openings 36 and 37 in the casing so that the fishing line 38 will be prevented from slipping off the pulley. When the line is reeled in, the pulley 24 is brought up to the rod lip and the sinker 56 is reeled in as far as desired.

From the foregoing description and a study of the drawings, it will be apparent that I have provided a new construction. It is, of course, to be understood that I reserve the right to make such changes in the form, construction and arrangement of parts as will not depart from the spirit of the invention, or the scope of the appended claims.

I claim:

1. In a fishing float, a pair of spaced parallel end wall members having inturned peripheral flanges, a float chamber between said end wall members in engagement with said flanges, a horizontally-disposed screw carried by end wall members, means for retaining the end wall members on the opposite ends of said screw, a pulley threaded on said screw for longitudinal movement therealong for the reception thereon of a fishing line, and means operatively connected to said pulley for maintaining said fish line on said pulley.

2. In a fishing float, a pair of spaced parallel end wall members having inturned peripheral flanges, a float chamber between said end wall members in engagement with said flanges, a horizontally-disposed screw carried by end wall members, means for retaining the end wall members on the opposite ends of said screw, a pulley threaded on said screw for longitudinal movement therealong for the reception thereon of a fishing line, means on said screw for limiting longitudinal movement of said pulley along said screw, and means operatively connected to said pulley for maintaining said fish line on said pulley.

3. In a fishing float, a pair of spaced parallel end wall members having inturned peripheral flanges, a float chamber between said end wall members in engagement with said flanges, a horizontally-disposed screw carried by end wall members, means for retaining the end wall members on the opposite ends of said screw, a pulley threaded on said screw for longitudinal movement therealong for the reception thereon of a fishing line, and means for limiting longitudinal movement of said pulley along said screw.

4. In a fishing float, a pair of spaced parallel end wall members having inturned peripheral flanges, a float chamber between said end wall members in engagement with said flanges, a horizontally-disposed screw carried by end wall members, means for retaining the end wall members on the opposite ends of said screw, a pulley threaded on said screw for longitudinal movement therealong for the reception thereon of a fishing line, means for limiting longitudinal movement of said pulley along said screw embodying a knurled knob threaded on said screw.

JACK J. KIRSCHMAN.

REFERENCES CITED

The following references are of record in the file of this patent:

UNITED STATES PATENTS

| Number | Name | Date |
|---|---|---|
| 1,886,063 | Sprague | Nov. 1, 1932 |
| 2,177,697 | Fairbanks et al. | Oct. 31, 1939 |
| 2,186,780 | DeWitt | Jan. 9, 1940 |
| 2,424,368 | Oberdorf et al. | July 22, 1947 |